March 23, 1926.                                       1,577,677
W. T. BEATTY
SCRAPER ATTACHMENT FOR ROAD SCARIFIERS
Filed Sept. 18, 1922        4 Sheets-Sheet 1

Inventor:
William T. Beatty
By Cheever & Cox Attys.

March 23, 1926.
W. T. BEATTY
SCRAPER ATTACHMENT FOR ROAD SCARIFIERS
Filed Sept. 18, 1922   4 Sheets-Sheet 2
1,577,677
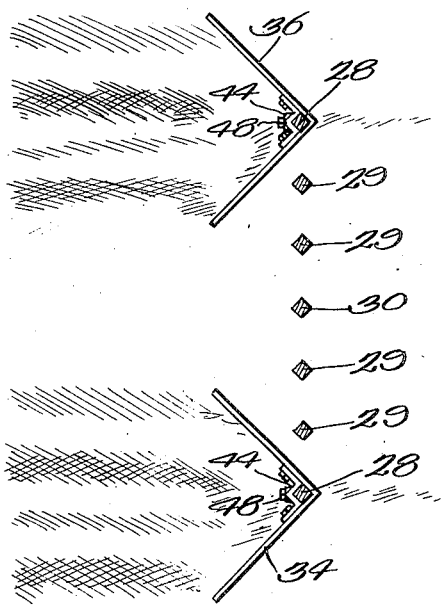
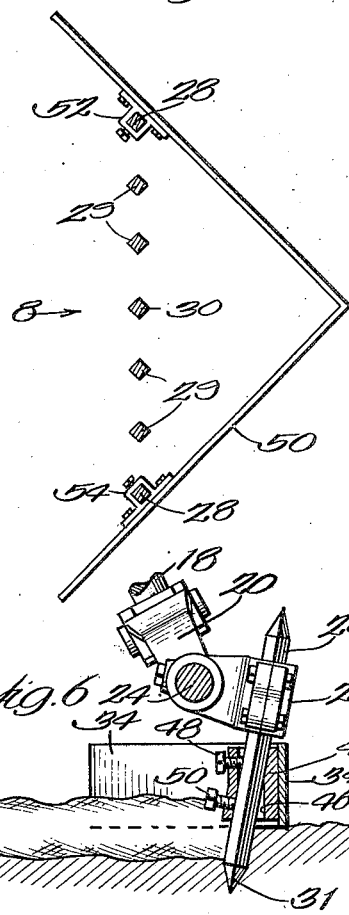
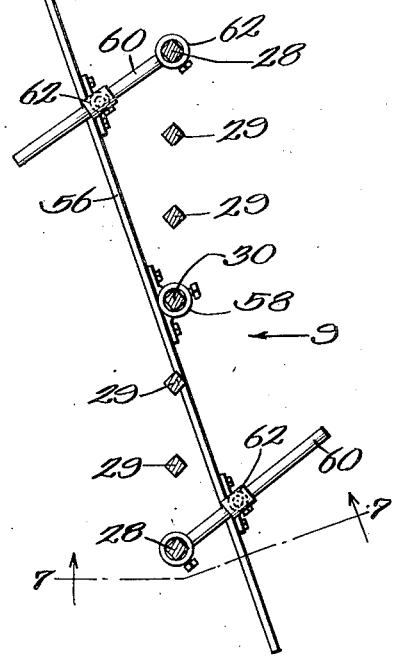
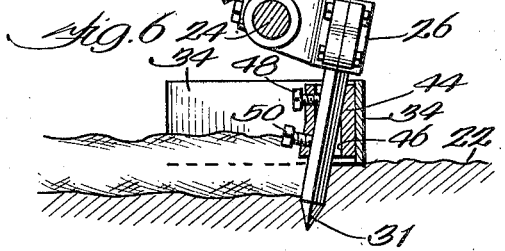
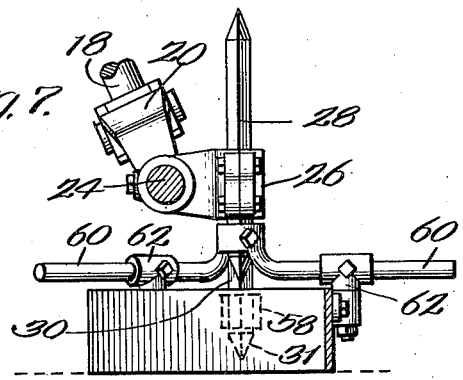
Inventor:
William T. Beatty
By Cheever & Cox Attys

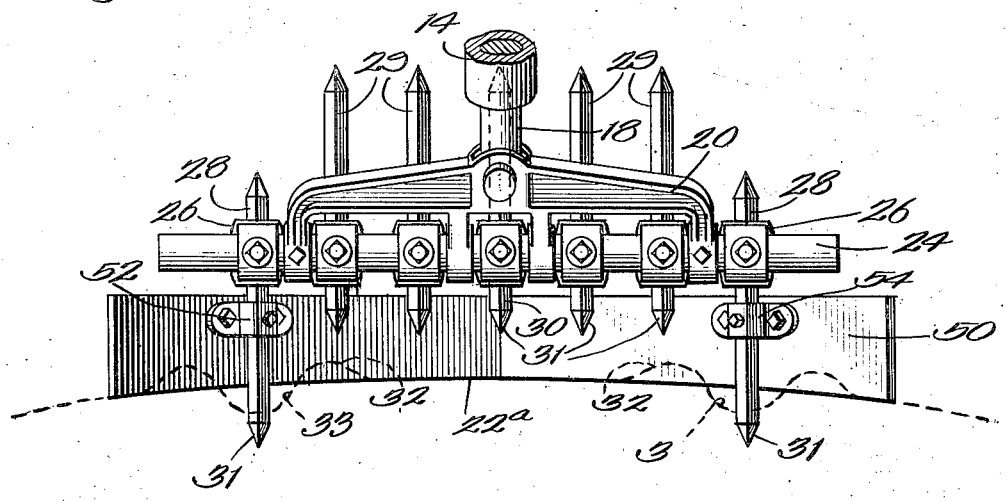
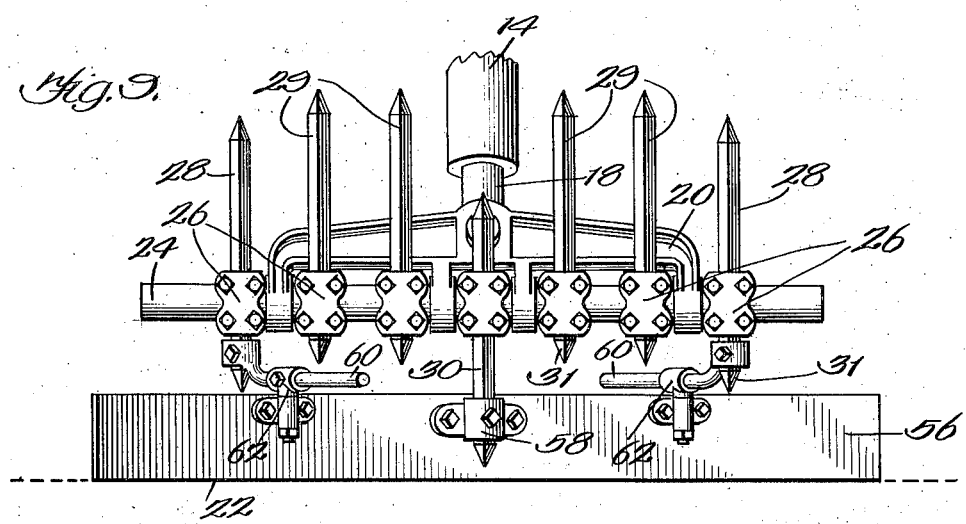
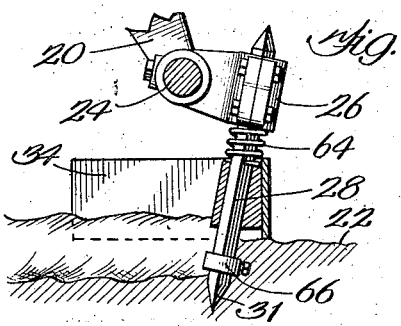

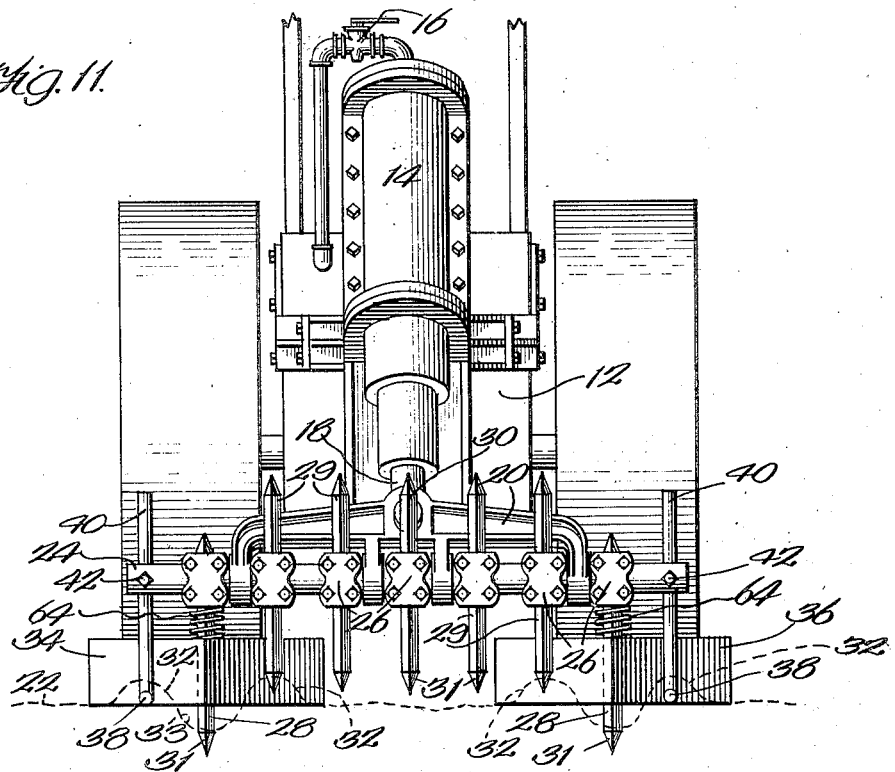

Patented Mar. 23, 1926.

1,577,677

UNITED STATES PATENT OFFICE.

WILLIAM T. BEATTY, OF FLOSSMOOR, ILLINOIS.

SCRAPER ATTACHMENT FOR ROAD SCARIFIERS.

Application filed September 18, 1922. Serial No. 588,826.

*To all whom it may concern:*

Be it known that I, WILLIAM T. BEATTY, a citizen of the United States, residing at Flossmoor, in the county of Cook and State of Illinois, have invented a certain new and useful Improvement in Scraper Attachments for Road Scarifiers, of which the following is a specification.

This invention relates to conventional road scarifiers (see, for instance, Figure 1 of the drawings, and Dewine Patent 1,030,-287, June 25, 1912) having a row of powerful tools or tines, usually vertically adjustable, extending across the machine, adapted to loosen and tear up the surface of an old roadway, preparatory to re-surfacing the same.

The objects of the invention are to provide such a machine with a road scraping or leveling tool attachable to one or more of the scarifying tines of the machine without interference with adjacent tines; to preferably but not necessarily adjust the scraper or leveling tool to different angular positions; to provide a cushion device for the scraper and to provide an adjustable depth gauge to control the pressure of the scarifier mechanism on the scraper.

The invention consists in means for attaining the foregoing and other objects; which can be easily and cheaply made; which is satisfactory in use and is not readily liable to get out of order. More particularly, the invention consists in specific mechanism for attaching the scraping device to a given tine; for adjusting it in position with reference thereto and in many features and details of construction hereafter more fully set forth in the specification and claims.

Referring to the drawings in which like numerals designate the same parts throughout the several views:

Figure 3 is a plan view of the scraping devices of Figures 1 and 2, taken on the line 3—3 of Figure 1.

Figure 4 shows another construction in which a single scraper is supported upon two separate tines.

Figure 5 is a detail plan view of still another construction in which a laterally swingable scraper is attached to a single tine and is provided with means for angularly supporting its outer ends.

Figure 6 is a side view partially in section taken on the line 6—6 of Figure 2 showing the details of fastening a scraper of Figure 3 to a tine.

Figure 7 is an end view taken on the line 7—7 of Figure 5.

Figure 8 is an end view taken at the point 8 of Figure 4.

Figure 9 is an end view at the point 9 of Figure 5.

Figure 10 shows means by which a scraper may be cushioned so as to allow it to follow irregularities in the road surface over which it travels.

Figure 11 is identical with Figure 2 except as it illustrates the use of springs 64 in connection with the scrapers 34—36.

Figure 12 is identical with Figure 9 except as it illustrates the use of springs 64 in connection with scraper 56.

Figure 13 is identical with Figure 7 except as it illustrates the use of springs 64 below member 26 of Figure 7.

Figure 1:
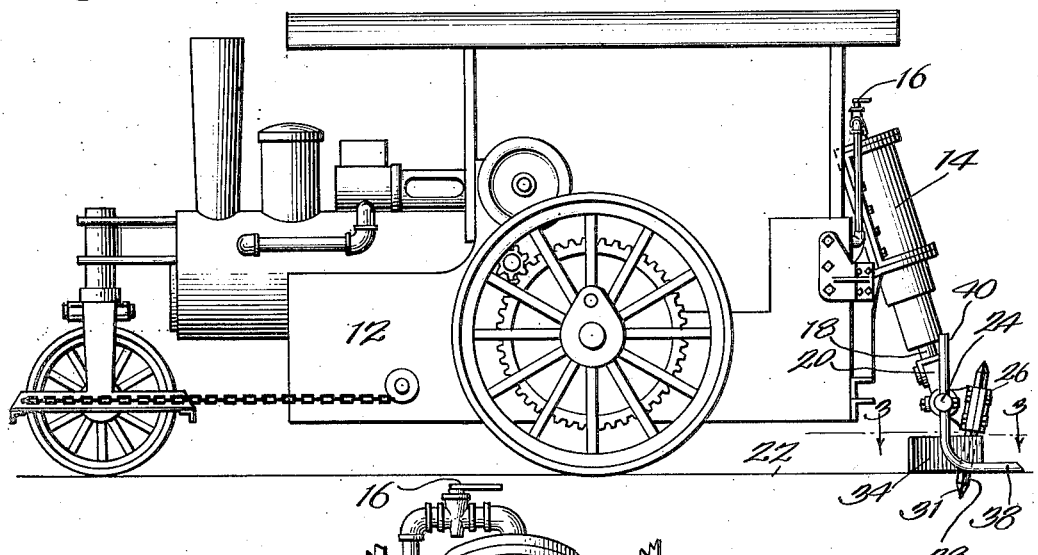
Figure 1 is a side elevation of a conventional form of self-propelled, scarifier carrying, road machine, having the mechanism of one form of this invention applied thereto.

Figure 1 shows conventionally any sort of self-propelled road machine 12, having a downwardly and rearwardly inclined power cylinder 14 arranged to, under the control of the power fluid valve 16, reciprocate a piston rod 18 having at its lower end a cross-head 20, carrying by any suitable means, as for instance a shaft 24, a plurality of tine gripping clamps 26, extending across the road 22 to be scarified, firmly but detachably holding generally vertically disposed tines 28—29—30, having sharpened points 31 adapted to enter and tear the road surface 22.

Figure 2:
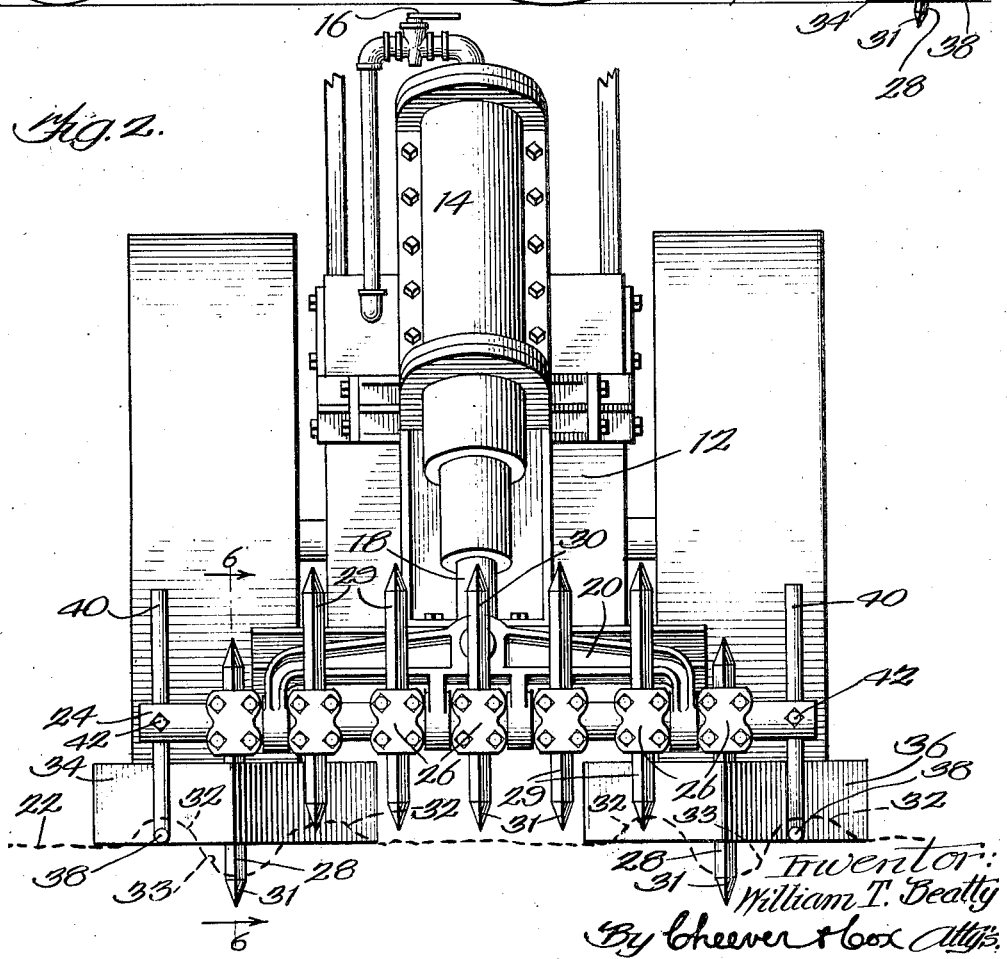
Figure 2 is an enlarged rear view taken from the right hand side of Figure 1.

There are various reasons, well understood by those skilled in the art, why it is desirable to provide immediately adjacent to one or more of the tines 28—30 a road scraping or leveling device to move loose material on the surface of the road laterally thereof to one side or the other as may be desired. For instance, if the road surface 22 has in it a well defined rut, comprising a distinct depression 33 between adjacent ridges 32, it is very often desirable not to scarify the entire road surface but to simply loosen the ridges 32 so that they can be scraped into the depression 33, at the same time loosening the bottom of the depression 33 so that the material from ridges 32 which is moved into it will, in packing down, take hold, so to speak, of the bottom of the depression 30 and become permanently attached thereto, a condition which will not occur if depression 33 is not roughened. The conventional scarifier of Figure 1 is rendered adaptable for this particular kind of road treatment by lowering the particular tine, as 28, which it is thought most desirable to have work in a particular road depression 33, while leaving the other adjacent tines at normal height and above the road surface 22 and by detachably securing to this particular selected tine, as 28, an angular scraper, as for instance 34, so vertically positioned that as the machine of Figure 1 moves to the left, the wings or blades of this scraper will gather the loose materials from ridges 32 and deposit them in rut depression 33. Figure 2 shows two such scrapers 34 and 36 separated one from the other and each adapted to take care of separate ruts 33 which are to be treated by the machine. The scrapers 34 and 36 may be placed on other tines 29 or 30 without departing from the invention.

When the tines and scrapers have been adjusted, as shown in Figures 1 and 3, the scrapers may, if desired, be held at a definite predetermined position with reference to the main road surface 22 by adjustable depth gauges, the same comprising shoes 38, slidable over the road surface and being selectively rigidly positioned on the ends of shaft 24 by means of upwardly extending rods 40 passing through the end portions of the shaft and selectively securable in place by adjustable set screws 42. In the particular case here illustrated, the shoe 38 and the rods 40 happen to be made from a single piece of angularly bent bar material. The operator can by loosening the set screws 42 raise or lower the shaft 24 on rods 40 to thereby raise or lower the tines 28 with reference to the ground 22. When, after making the adjustment, he tightens up the set screws 42, the shoes 38 prevent the lower ends of the tines entering the ground an amount more than the distance predetermined by the fixed distance of the shoes 38 with reference to the tines, and this prevents an undue pressure by the scarifier on the scraper or scrapers.

Each one of the scrapers 34 or 36 is detachably secured in different selected vertical positions with reference to the tine to which it is secured by some sort of a clamping device, that shown in Figure 6 being desirable. In this particular construction, the scraper carries rigidly attached to it by any suitable means a block 44, having through it a vertically disposed tine receiving passage 46 of greater size than the tine 28, this passage being entered at its side by two vertically separated set screws 48 and 50 by adjusting which the operator can insure the scraper being substantially level with reference to the ground—regardless of the particular angular position of the given tine to which it is attached.

When, for any reason, it is desired to use a scraper which will travel over a wider space on the road than can be conveniently and safely carried by a single tine of the machine, a triangular scraper 50 of the type shown in Figure 4 may be provided, the same having at proper points tine gripping devices 52 and 54 adapted to engage two previously selected separated tines in the row of tines 28—29—30. Scraper 50 is particularly desirable where the road 22 is more or less crowned as shown at 22ª Fig. 8. The particular scraper 50 shown happens to be designed to reach from tine 28 to tine 28 but this is immaterial.

If, for any reason, the scrapers of Figures 3 and 4 do not fill the bill, a straight scraper 56 may be provided pivotally adjustable by any suitable mechanism 58 to, preferably, but not necessarily, tine 30 at or near the center of the machine. The ends of this scraper 56 may be braced with reference to the scarifier by braces 60 provided with pivotal devices 62 for attaching them to certain tines on the row of tines, in the particular case here illustrated only end tines 28. These braces 60 are slidably adjustable through clamp 62 at suitable points on the scraper 56. By suitably adjusting this scraper 56 as to angular position and by raising the tines, as 29, not required for the supporting of the scraper 56, to the position shown in Figure 9, the angularly adjustable scraper 58 may be attached to the scarifying machine of the class described and the machine may therefore be readily converted into a plain road scraper notwithstanding the presence of the scarifying tools.

Should there be any occasion, one or all of the scrapers 34—50—56 may be cushioned, as for instance by coiled springs 64 placed between the scraper and the adjacent tine clamp 26 of the particular tine on which the scraper is mounted. In such a case, the set screws 48 and 50 are of course omitted or otherwise rendered inoperative to hold the particular scraper rigid in its adjacent particular tine. Under these conditions, a stop 66 should be placed on the adjacent tine to prevent the scraper reciprocating too far on the tine. This construction enables the particular scraper used to follow irregularities in the road surface 22 in spite of the gauges 38—40.

In general operation, the operator first examines the road conditions to see what work is required and then selectively applies the scrapers 34 and 36 (or either of them) or 50 or 56, making the adjustments shown in the drawings and heretofore described in connection with each of these different scrapers and then proceeds to manipulate the machine 12 to work upon the road with the particular scraper selected.

The words "self-contained" are in some of the claims used to define a machine which carries its power plant on its own traction wheels as distinguished from a machine acquiring its power from an outside source, such as an independent tractor, a team of horses or the like.

Having thus described my invention what I claim as new and desire to secure by Letters Patent is:

1. In a scarifier, the combination with tines adapted to enter a road surface, of a road scraper slidably mounted on the tines, and means to cushion sliding movement of said scraper on said tines.

2. In a scarifier, in combination with tines adapted to enter a road surface, a road scraper, and cushioning means for the scraper mounted directly on the tines.

3. In a scarifier, the combination with tines adapted to enter a road surface, a road scraper, and cushioning means for the scraper, said scraper and means being directly mounted on the tines.

4. In a scarifier, in combination with tines adapted to enter a road surface, a road scraper, and spring cushioning means for the scraper mounted directly on the tines.

5. In a scarifier, in combination with tines adapted to enter a road surface, a road scraper mounted for up and down movement with respect to said tines, and means on at least one of said tines for cushioning movement of said scraper.

6. In a scarifier, in combination with tines and means supporting the same, a road scraper mounted for longitudinal movement with respect to said tines, and a coil spring on at least one of said tines between said tine supporting means and said scraper cushion movements of the latter.

7. In a road machine, the combination with a multiple tine elevatable and depressible scarifier, means for adjusting one of said tines parallel to the other tines, a road scraper, and cushion means for the scraper, said scraper and means being directly mounted on the adjustable tine.

8. In a road machine, in combination with a multiple tine elevatable and depressible scarifier, means for adjusting one of said tines parallel to the other tines, a road scraper, and spring cushion means for the scraper, said scraper and means being directly mounted on the adjustable tine.

9. In a scarifier, in combination with tines adapted to enter a road surface, a road scraper, and means mounting the scraper for rotary adjustment about the axis of one of the tines.

10. In a road machine in combination with a multiple tine elevatable and depressible scarifier, means for adjusting one of said tines parallel to the other tines, a road scraper and means mounting the scraper for rotary adjustment about the axis of the adjustable tine.

11. In a scarifier, in combination with a tine adapted to enter a road surface, a road scraper, means mounting the scraper for rotary adjustment about the axis of the tine, and means extending from the scraper to a part of the scarifier mechanism remote from said tine bracing the scraper in adjusted position.

12. In a road machine in combination with a multiple tine elevatable and depressible scarifier, means for adjusting one of said tines parallel to the other tines, a road scraper, means mounting the scraper for rotary adjustment about the axis of the tine, and means extending from the scraper to a part of the scarifier mechanism remote from said tine bracing the scraper in adjusted position.

13. In a scarifier, in combination with tines adapted to enter a road surface, a road scraper, and means mounting the scraper for vertical movement along and for rotary adjustment about the axis of one of said tines.

14. In a road machine in combination with a multiple tine elevatable and depressible scarifier, means for adjusting one of said tines parallel to the other tines, a road scraper and means mounting the scraper for rotary adjustment about and for vertical movement along the axis of said adjustable tine.

15. In a scarifier, the combination of a scarifying mechanism including tines, power means for positioning said mechanism, a road scraper, and means for mounting the scraper on the tines in different rotated positions about the axis of one of said tines.

In witness whereof, I have hereunto subscribed my name.

WILLIAM T. BEATTY.